United States Patent
Bakke

(10) Patent No.: US 9,762,922 B2
(45) Date of Patent: *Sep. 12, 2017

(54) VIRTUAL FRAME BUFFER SYSTEM AND METHOD

(71) Applicant: Steve Bakke, Richardson, TX (US)

(72) Inventor: Steve Bakke, Richardson, TX (US)

(73) Assignee: Netzyn, Inc.

( * ) Notice: Subject to any disclaimer, the term of this patent is extended or adjusted under 35 U.S.C. 154(b) by 223 days.

This patent is subject to a terminal disclaimer.

(21) Appl. No.: 14/331,358

(22) Filed: Jul. 15, 2014

(65) Prior Publication Data

US 2015/0131727 A1    May 14, 2015

Related U.S. Application Data

(63) Continuation of application No. 13/176,843, filed on Jul. 6, 2011, now Pat. No. 8,824,560.

(60) Provisional application No. 61/361,969, filed on Jul. 7, 2010.

(51) Int. Cl.
| | |
|---|---|
| H04N 19/433 | (2014.01) |
| H04N 19/50 | (2014.01) |
| H04N 19/423 | (2014.01) |
| H04N 19/507 | (2014.01) |
| H04N 19/513 | (2014.01) |

(52) U.S. Cl.
CPC ......... *H04N 19/433* (2014.11); *H04N 19/423* (2014.11); *H04N 19/50* (2014.11); *H04N 19/507* (2014.11); *H04N 19/513* (2014.11)

(58) Field of Classification Search
CPC ..... H04N 19/50; H04N 19/507; H04N 19/423
USPC ............ 375/240.23, 240.24, 240.25, 240.26
See application file for complete search history.

(56) References Cited

U.S. PATENT DOCUMENTS

| | | | | |
|---|---|---|---|---|
| 6,067,321 | A * | 5/2000 | Lempel | 375/240.24 |
| 6,614,442 | B1 * | 9/2003 | Ouyang et al. | 345/545 |
| 2004/0264580 | A1 * | 12/2004 | Chiang Wei Yin et al. | 375/240.25 |
| 2005/0047510 | A1 * | 3/2005 | Yamaguchi et al. | 375/240.26 |
| 2006/0222080 | A1 * | 10/2006 | Wang | 375/240.24 |
| 2006/0244819 | A1 * | 11/2006 | Pun et al. | 348/14.09 |
| 2008/0063082 | A1 * | 3/2008 | Watanabe et al. | 375/240.23 |

* cited by examiner

*Primary Examiner* — Zhihan Zhou
(74) *Attorney, Agent, or Firm* — The Law Firm of H. Dale Langley, Jr. P.C.

(57) ABSTRACT

A system for encoding and decoding a frame (also file), such as a video, graphic, media, or other frame or data, representing a real-time graphic output from a frame buffer, output by a video camera, or another file or data. The file includes frames each comprising macroblocks. Reference frame buffers (PFTs), virtual frame buffer tables (VFTBs) of equal number to the PFTs, each VFTB corresponds to a respective PFT, and respective sectors of each PFT for respective macroblocks are created. Frames of the file are encoded/decoded by successive encode/decode of macroblocks. A pointer is created in the VFBT associated with the PFT rather than encoding/decoding any matching macroblock. The pointer and its reference are relied on for each already encoded/decoded macroblock retained in the PFT. Processing, memory, bandwidth and power requirements for encoding or decoding are reduced.

8 Claims, 5 Drawing Sheets

VIRTUAL FRAME BUFFER SYSTEM AND METHOD

CROSS-REFERENCE TO RELATED APPLICATION

The present application is a continuation and has benefit of priority of U.S. patent application Ser. No. 13/176,843, titled "Virtual Frame Buffer Systems and Methods, filed Jul. 6, 2011 (which has benefit of priority U.S. Provisional Patent Application No. 61/361,969, titled "Virtual Frame Buffer Systems and Methods", filed Jul. 7, 2010), which prior application is co-pending and has at least one same inventor of the present application and is herein incorporated by this reference.

TECHNICAL FIELD

The present invention generally relates to video encode and decode devices and processes, and more particularly relates to video encode and decode devices and processing of computing graphics which are relatively static in nature, and reducing processing, bandwidth, memory and power requirements in such devices and processing.

BACKGROUND

In the process for communicating digitized video over a network from one point/node to another point/node, the video is encoded at the sender side device, communicated over the network from the sender side device to the recipient side device, and then decoded at the recipient side device. This encoding/decoding reduces the quantity of data that must be communicated to deliver the video from the sender to the recipient, and therefore reduces the amount of bandwidth of the network required for the communication. Typically, video is encoded/decoded according to a specified technical standard, such as MPEG1, MPEG2, H.263, VC-1 and H.264.

These encode/decode standards are somewhat similar in process and device requirements. In particular per each standard, digitized video is stored as a series of "frames" in multiple "frame buffers" in memory, and each frame buffer for each frame is segregated into a plurality of smaller "macroblock" segments. Encoding and decoding operations each include processing the frames in sequence, via respective sequential processing of the frames via frame buffers for each frame on a macroblock by macroblock basis for each frame. For video comprising at least some fairly same or static data from time-to-time among respective macroblocks (i.e., either of same or other frames), much of the processing required for encoding and decoding is primarily mere copying of data contents. In particular, data of each static macroblock of a frame buffer memory location must be copied into another frame buffer memory location, and this process repeated for every static macroblock of each frame buffer. Both the encoder of the encode side device and the decoder of the decode side device must typically perform these copy and similar operations for each static macroblock, and for all static macroblocks of each frame buffer and frame of the series for the entire video. Thus, these copy operations consume processing time and capacity.

It would therefore be desirable, and a significant improvement in the art and technology, to provide more efficient encode and decode devices and processes, particularly for fairly same or static data (e.g., representing video, graphics, and similar and other information sets and files) and other instances.

SUMMARY

Embodiments of the invention include devices and methods for encoding or decoding a file, such as a video, graphic, media, or other file communicated over a network or otherwise, with reduced processing, memory, bandwidth and power requirements. In the embodiments, the devices and methods either encode/decode each next successive macroblock of a frame of the file or, if that macroblock matches any macroblock that has already been encoded/decoded (as applicable) of a prior frame and which is then-retained in a reference frame buffer, create and store a pointer in a virtual frame table buffer that points to the previously encoded/macroblock already in the reference frame buffer, rather than encode/decode the macroblock for encoding and/or decoding operations.

An embodiment of the invention is a device for encoding or decoding a file. The file includes frames and each frame comprises macroblocks. The device includes memory, a processor communicatively connected to the memory, an encoder communicatively connected to and controlled by the processor, a plurality of reference frame buffers created in the memory by the encoder, where each reference frame buffer is distinct from any other reference frame buffers in the memory, virtual frame buffer tables, equal in number to number of the reference frame buffers in the memory, created in the memory by the encoder/decoder, each virtual frame buffer table, respectively, corresponds to one reference frame buffer, sectors of each reference frame buffer, each sector is capable of storing one of the macroblocks of one frame of the file, and a respective pointer created by the encoder/decoder if any macroblock for encoding/decoding (of any frame) matches any macroblock of another frame previously encoded/decoded and the encoded/decoded macroblock is then-retained in one of the reference frame buffers. The encoder either encodes each next macroblock of a frame or, if that next macroblock matches any macroblock that was previously encoded and if the encoded macroblock is then-retained in any of reference frame buffers, the encoder instead creates the respective pointer and stores the respective pointer in the virtual frame buffer table corresponding to the frame of that next macroblock.

Another embodiment of the invention is a system according to the foregoing encoder or decoder, wherein at least certain of the encoder is the decoder, and vice versa, and the system further includes a communication network, a first device connected to the communication network, the first node includes at least portions of the encoder, and a second device connected to the communication network, the second node includes at least portions of the decoder. The encoded file is communicated by the first node to the second node over the network for decoding.

Another embodiment of the invention is a system including the encoder and decoder just described above, and also including a communication link between the encoder and the decoder.

Yet another embodiment of the invention is a system including the encoder and decoder described above, where at least certain of the encoder is the decoder, and vice versa.

Another embodiment of the invention is a method of encoding a file. The file comprises frames and each frame comprises macroblocks for encoding. The method includes creating in a memory a plurality of reference frame buffers, wherein each reference frame buffer is distinct from any other of the plurality of reference frame buffers in the memory, each reference frame buffer capable of containing one of the frame, creating in the memory a plurality of virtual frame buffer tables, equal in number to number of the reference frame buffers in the memory, each virtual frame buffer table, respectively, corresponds distinctly to one of the reference frame buffer, respectively, creating a plurality of respective sectors of each reference frame buffer, respectively, each respective sector sufficient for storage of one of the macroblocks corresponding to part of one of the frame of the file, encoding one of the frames of the file, by successively encoding each respective one of the macroblocks of the one of the frame, unless any already encoded macroblock (if any) then-retained in any of the respective sectors of any of the reference frame buffers would be the same as the encoded macroblock, once encoded in the step of encoding, storing respective ones of the encoded macroblocks, each respectively corresponding to respective ones of the macroblocks of the one of the frame of the file from the step of encoding, in respective ones of the plurality of respective sectors, except not storing one of the encoded macroblocks if any already encoded macroblock (if any) then-retained in any of the respective sectors of any of the reference frame buffers would be the same as the encoded macroblock, once encoded in the step of encoding, creating a respective pointer in the virtual frame buffer table associated with the reference frame buffer then available for the step of encoding, for each macroblock (if any) of the frame then-currently for the step of encoding, if any macroblock of one of the frame previously encoded matches the macroblock of the step of creating a respective pointer and if the encoded macroblock of the frame previously encoded is then-retained in any of the reference buffer tables, storing the respective pointer from the step of creating the respective pointer (if performed), in the virtual frame buffer table associated with the reference frame buffer for the step of encoding, and returning to the step of encoding, but rather than encoding the macroblock in the step of encoding, relying on the respective pointer for encoding in order to reference the encoded macroblock. The encoder during encoding either encodes each next one of the macroblock of the frame or, if any macroblock of another one of the frames previously encoded is then-retained in any of the plurality of reference frame buffers, creates the respective pointer and stores the respective pointer in the virtual frame buffer table corresponding to the frame then being encoded.

Another embodiment of the invention is a method of decoding an encoded file. The encoded file comprises encoded frames and each encoded frame comprises encoded macroblocks for decoding and the file, when decoded, comprises frames and each frame comprises macroblocks. The method includes creating in a memory a plurality of reference frame buffers, wherein each reference frame buffer is distinct from any other of the plurality of reference frame buffers in the memory, each reference frame buffer capable of containing one of the encoded frame, creating in the memory a plurality of virtual frame buffer tables, equal in number to number of the reference frame buffers in the memory, each virtual frame buffer table, respectively, corresponds distinctly to one of the reference frame buffer, respectively, creating a plurality of respective sectors of each reference frame buffer, respectively, each respective sector sufficient for storage of one of the macroblocks corresponding to part of one of the frame of the file, decoding one of the encoded frames of the encoded file, by successively decoding each respective one of the encoded macroblocks of the one of the encoded frame, unless the encoded macroblock, once decoded, would match any macroblock previously decoded and then-retained in any of the respective sectors of any of the reference frame buffers, storing respective ones of the macroblocks, each respectively corresponding to respective ones of the macroblocks of the one of the frame of the file from the step of decoding, in respective ones of the plurality of respective sectors, except not storing one of the macroblocks if the macroblock, once decoded, would match any macroblock previously decoded and then-retained in any of the respective sectors of any of the reference frame buffers, creating a respective pointer in the virtual frame buffer table associated with the reference frame buffer then available for the step of decoding, for each encoded macroblock (if any) of the encoded frame then-currently for the step of decoding if the encoded macroblock, once decoded, would match any macroblock previously decoded and retained in any of the reference buffer tables, storing the respective pointer from the step of creating the respective pointer (if performed), in the virtual frame buffer table associated with the reference frame buffer for the step of decoding, and returning to the step of decoding, but rather than decoding the encoded macroblock in the step of decoding, relying on the respective pointer for decoding in order to reference the macroblock. The decoder during decoding either decodes each next encoded macroblock of the encoded frame or, if any encoded macroblock of another encoded frame previously decoded is then-retained in any of the plurality of reference frame buffers, instead creates the respective pointer and stores the respective pointer in the virtual frame buffer table corresponding to the encoded frame then being decoded.

Another embodiment of the invention is an encode device operating in accordance with the foregoing method of encoding a file.

Yet another embodiment of the invention is a decode device operating in accordance with the foregoing method of decoding an encoded file.

Another embodiment of the invention is an encoder/decoder device for processing a single reference frame. The encoder/decoder device includes a virtual frame buffer table of a single bit array in a memory and a processor connected to the virtual frame buffer table for writing the single reference frame to the single bit array.

BRIEF DESCRIPTION OF THE DRAWINGS

The present invention is illustrated by way of example and not limitation in the accompanying figures, in which like references indicate similar elements, and in which.

DETAILED DESCRIPTION

Figure 1:
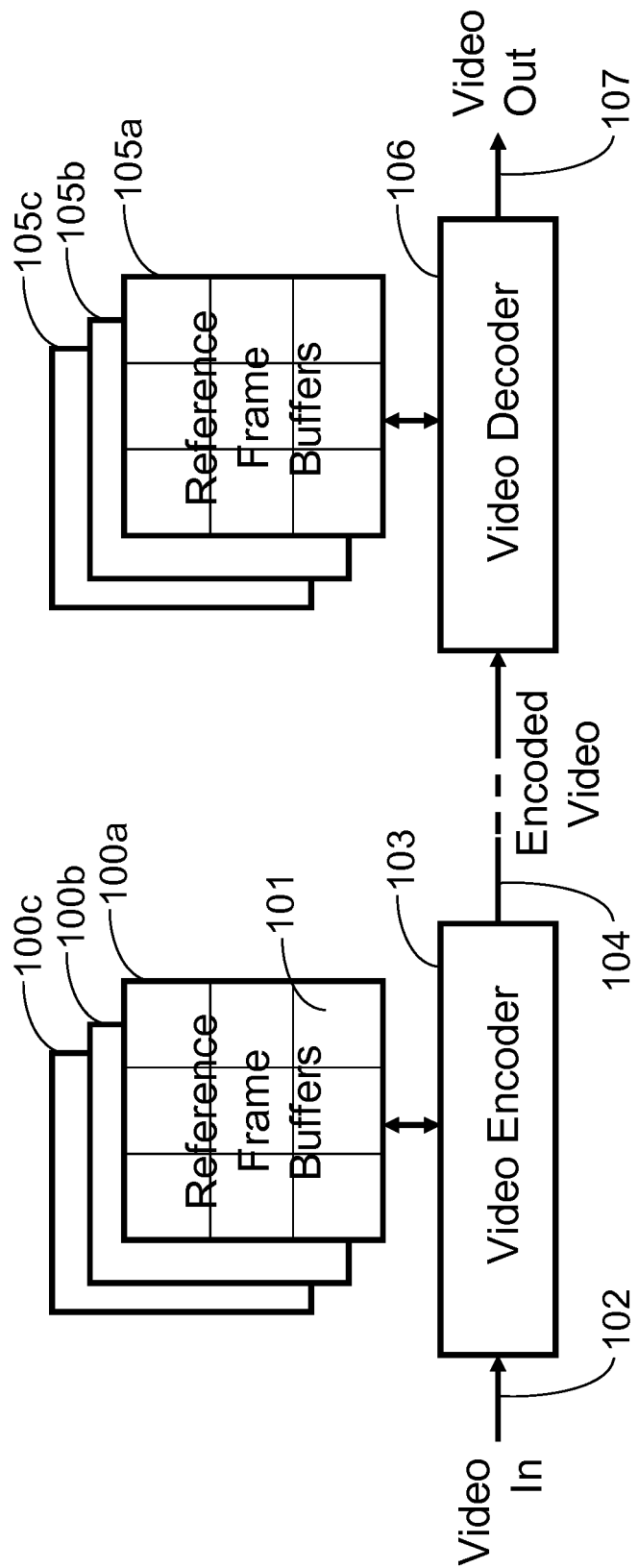
FIG. 1 illustrates an exemplary system of three frame reference buffers for video encoding and decoding, according to certain embodiments of the invention.

Referring to FIG. 1, a typical video encoding/decoding system 10 illustrates pixels representing a video file (Video In) 102 input to a video encoder 103 on a frame-by-frame basis for the video file. For purposes of this disclosure, the terms "video file", "video graphic", "graphic" or "file" means a set, series, collection or combination (or subset or portion thereof) of video frames stored or storable in a non-transitory tangible media, the video frames representing all or a portion of a graphic, media, video, picture, or other display of a processor device, such as a computer, smart phone, tablet computer, laptop computer, or other computing or display rendering device. Video files and video frames thereof, for example, include (among others) real-time frame buffer contents that are output of a graphics processor unit (either hardware, software, or combinations), real-time frame buffer contents that are output of a video camera or video device, or other buffer or memory contents read or readable from a storage device, such as hard drive, flash memory, or other tangible media.

An example of each video frame of the video is a respective 48 by 48 pixel graphic. When encoding video, the video encoder 103 processingly encodes the video converting it from the input format to another format, for example, for purpose of standardization, speed, security and/or compression as will be understood, to create an encoded video file 104. The video encoder 103 also creates and stores reference frame(s) of the encoded video file 104 in one or more reference frame buffers 100 in memory, for example, Reference Frame Buffers 100a, 100b, 100c, in process of encoding. Other numbers of reference frame buffers 100 are possible for encoding operations, and the reference frame buffers 100 are intended only as examples for purposes of discussion. To encode the video, the video encoder 103 processes each frame of the video file 102, typically, in succession, progressing through each frame in respective blocks of data representing pluralities of distinct sub-portions of each frame of the video. These blocks of data are referred to, for purposes herein, as macroblocks, and each as a macroblock. Therefore, as the video encoder 103 processes and stores the processed frames of the video in the reference frame buffers 100, the processed frames are stored, macroblock by macroblock of each frame, by the encoder 103 in storage memory (not shown in detail in FIG. 1).

An example macroblock size is 16×16 pixels and, for this example, a 48×48 pixel graphic would represent 3 (48/16)×3 (48/16) or 9 total macroblocks (e.g., Reference Frame Buffer 100a is, for purposes of the example, segregated into nine macroblocks, of which macroblock 101 is one). Each macroblock occupies a specific block of memory for the applicable Reference Frame Buffer 100a, 100b or 100c. In the case of macroblock 101 and example of 16×16 pixels, the macroblock 101 (when represented in a typical video format) requires 384 bytes of memory in each of the Reference Frame Buffers 100a, 100b, 100c. The total memory for each Reference Frame Buffer 100a, 100b, 100c, therefore, is 384 bytes×9 for a total size of 3456 bytes of memory.

The video encoder 103 processes the video creating Reference Frame Buffers 100a, 100b, 100b and using these to encode the video, creating as output the encoded video file 104. The encoded video 104 output by the encoder 103 is stored (not shown in detail in FIG. 1) and/or delivered (e.g., communicated) to a video decoder 106, such as via a network, circuit(s), or otherwise. The video decoder 106 receives input of the encoded video 104 and processes it by converting the encoded video 104 back to the decoded format of the video file 102 originally input to the encoder 103 (or another decoded format for use by the recipient side, as will be understood), creating a video file (Video Out) 107 of the decoded format as output. The decoding process includes, for example, decompressing, reversing or changing technical standard, permitting, and/or other operability or access presenting at the recipient side as will be understood. In the process of decoding, the video decoder 106 creates Reference Frame Buffers 105a, 105b, 105c in memory of same number and size as those of the Reference Frame Buffers 100a, 100b, 100c of the encoder 103. The video is decoded by the video decoder 106 on a frame by frame, macroblock per macroblock per frame, basis, and the video decoder 106 outputs each video frame, i.e., as the Video Out 107. At respective given points during decoding, contents of the Reference Frame Buffers 105a, 105b and 105c for the decoder 106 are the same as the contents of the Reference Frame Buffers 100a, 100b, 100c, respectively, of the encoder 103 during encoding at corresponding points (but for encode purposes, rather than decode purposes).

Figure 5:
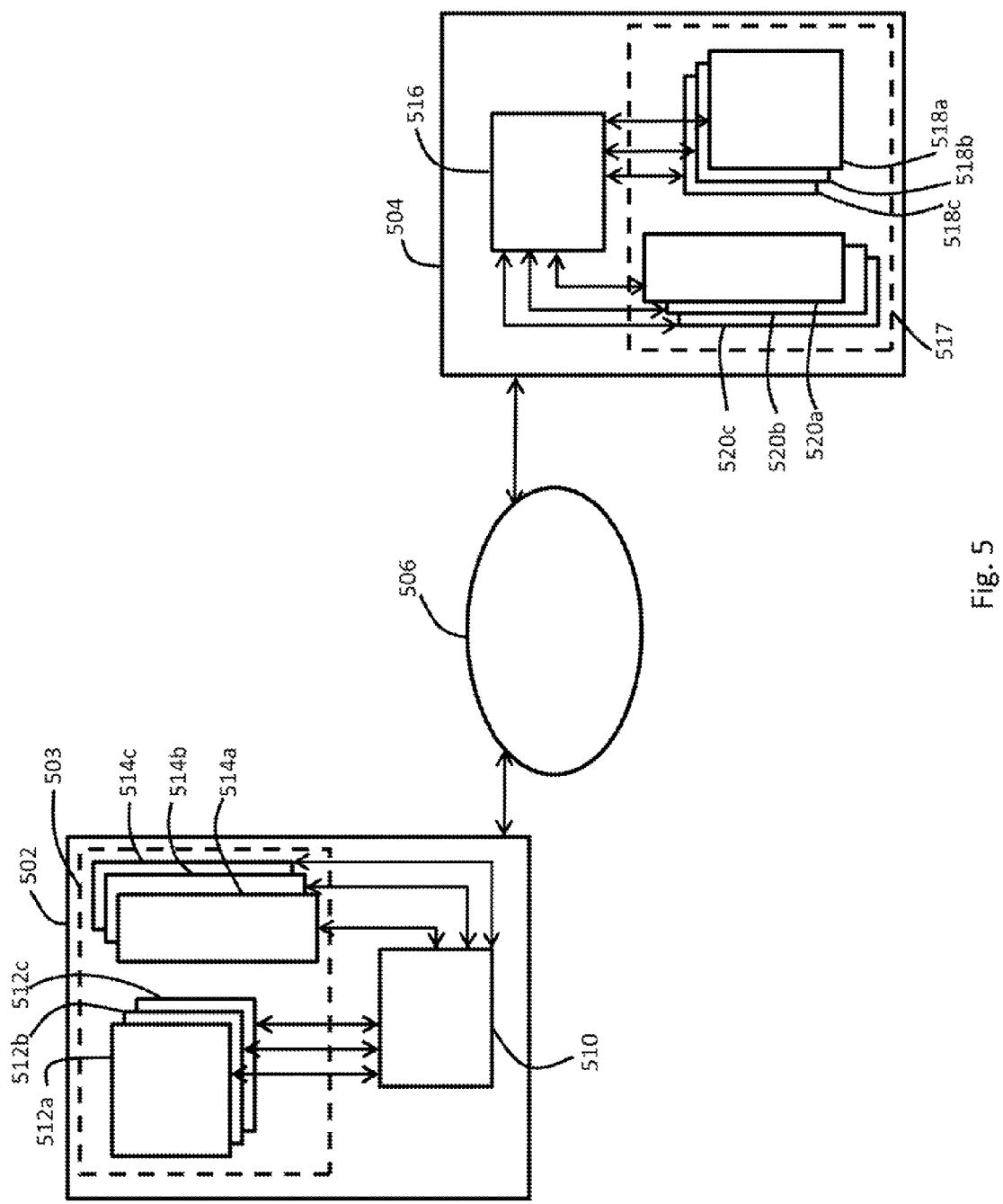
FIG. 5 illustrates a system including an encoder communicatively connected by a communication network to a decoder, according to certain embodiments of the invention.

Referring now to FIG. 5, according to certain embodiments, a system 50 includes an encode device 502 and a decode device 504. The encode device 502 and the decode device 504 are communicatively connected by a communication link, for example, a wired, wireless, cellular, optical, satellite or other communication network 506, combinations of these, or connected/interconnected networks such as any combinations of these. The encode device 502 includes a video encoder 510 communicatively connected to memory 503. The video encoder 510 is, includes, or is controlled by a processing device, for example, the video encoder 510 is a microprocessor, software program stored in memory, logic circuit, or combinations of these, or other processor(s). The memory 503 is any writable data storage, for example, random access memory (RAM), harddrive, floppy drive, compact disk (CD), flash drive, digital video disk (DVD), or combinations of these, or any other writable data container(s). The decode device 504 includes a video decoder 516 communicatively connected to memory 517. The video decoder 516 is, includes or is controlled by a processing device. For example, the video decoder 510 is a microprocessor, software program stored in memory, logic circuit, or combinations of these, or other processor(s). The memory 517 is any writable data storage, for example, random access memory (RAM), harddrive, floppy drive, compact disk (CD), flash drive, digital video disk (DVD), or combinations of these, or any other writable data container(s).

The video encoder 510, in operation with the memory 503, processingly encodes a digitized video file representing a playable video. A source of the digitized video file is, for example, a frame buffer of a graphics card or video camera or of a memory or storage media, the contents of which are output to the video encoder 510. When encoding the video, the video encoder 510 processingly creates in the memory 503 a plurality of reference frame buffers (hereafter referred to for convenience as "physical frame buffers" or (PFBs) to distinguish from the Reference Frame Buffers of FIG. 1) and a plurality of respective virtual frame buffer tables (VFBTs). For purposes of example, FIG. 5 illustrates three PFBs 512a, 512b, and 512c and three VFBTs 514a, 514b, 514c. The number of the virtual frame buffer tables/VFBTs is the same number of the reference frame buffers/physical frame buffers/PFBs. Although three PFBs and three VFBTs are illustrated and described for example purposes, the number of PFBs and VFBTs will in each instance be the same (except as per certain alternative embodiments later described with respect to FIG. 4), with each PFB having a corresponding VFBT for such PFB.

The video encoder 510 then processingly encodes a first frame of the video file, by encoding, on a macroblock by macroblock basis, respective macroblocks of the first frame, creating respective encoded macroblocks (not shown in detail in FIG. 5) for the first frame via one of the VFBTs, for example, VFBT 512a, and storing the encoded macroblocks in one of the PFBs for the first frame, for example, in PFB 514a. Each pointer element of the VFBT 512a now identifies PFB 514a. The video encoder 510 then next proceeds to processingly encode a second frame of the video file, for example, via VFBT 512b and PFB 514b, macroblock by macroblock. For macroblocks that are not then-contained in any PFB 514a, 514b, 514c, the macroblocks are saved in the PFB 514b by the video encoder 510 and respective pointer elements therefor are saved in the VFBT 512b to identify PFB 514b as containing the saved macroblocks, respectively. For any macroblock of the second frame that is duplicate of a previously encoded macroblock (the video encoder 510 detects any duplicate; which would not be the case in encoding of the first frame, but can be the case with the second or subsequent frames of the digitized video file) then-retained in any PFB (i.e., in the case of the second frame, any match already in the PFBs could only be in PFB 514a), rather than encoding and saving that duplicate macroblock in the PFB 514b, the video encoder 510 instead sets a pointer element (not shown in detail in FIG. 5) stored in the VFBT for the second (or other subsequent) frame (i.e., in the VFBT 512b in the example) identifying the macroblock of the PFB 514a which would otherwise be duplicated (i.e., rather than encoding and storing in PFB 514b). The pointer element represents an identifier of a PFB that contains the encoded macroblock corresponding to the duplicate macroblock that was previously encoded, and also of a particular PFB sector (not shown in detail in FIG. 5) containing the previously encoded macroblock of that PFB.

The video encoder 510 continues processingly encoding each next frame of the digitized file in succession or, if any macroblock(s) of the frame is duplicate of any previously encoded macroblock then retained in any of the PFBs 512a, 512b, 512c, skipping encoding and storing of the macroblock and instead creating the respective pointer element for the previously encoded macroblock (and PFB sector and PFB thereof) and storing it in the VFBT for the particular frame. As encoding of each respective video frame is performed by the video encoder 510, the video encoder 510 can store and/or communicate the encoded video frame from the video encoder 510, or otherwise deliver or make available the frame from the encode device 502, for decoding by the decode device 504. Alternately, if desired in the embodiment, the video encoder 510 completes encoding of the video file in in entirety (or in portion, if applicable in the embodiment, for example, where portions are reconstituted as the whole or otherwise at a decoder), and then communicates or stores the video, as applicable.

According to certain embodiments, the encoded video file from the video encoder 510 is communicated from the encode device 502 to the decode device 504, via the communications network 506. The decode device 504, in operation with the memory 517, processingly decodes the encoded video file created by the video encoder 510. In decoding, the video decoder 516 of the decode device 504 processingly creates in the memory 517 a plurality of reference frame buffers, i.e., PFBs, distinct from those of the encode device 502. The video decoder 516 also processingly creates in the memory 517 a plurality of respective virtual frame buffer tables, i.e., VFBTs, distinct from those of the encode device 502. As an example, FIG. 5 illustrates three PFBs 518a, 518b, and 518c and three VFBTs 520a, 520b, 520c of the decode device 504. As with the encode device 502, the decode device 504 has same number of the VFBTs as number of the PFBs Although three PFBs and three VFBTs of the decode device 504 are illustrated and described for example purposes, the number of PFBs and VFBTs will in each instance be the same and the number of PFBs (and consequently of VFBTs) equals the number of the PFBs (and VFBTs) of the encode device 502.

Continuing in operation, the video decoder 516 processingly decodes a first frame of the encoded video file, by decoding, on a macroblock by macroblock basis, respective macroblocks of the first frame via one of the PFBs and its VFBT, creating respective decoded macroblocks (not shown in detail in FIG. 5) for the first frame in, for example, via the VFBT 520a and the PFB 518a. The video decoder 516 proceeds, processingly decoding and storing a second frame of the digitized video file via another VFBT and PFB, for example, VFBT 520b and PFB 518b, for the second frame, macroblock by macroblock; however, rather than decoding and storing any macroblock of the second encoded frame that is duplicate of a previously decoded macroblock then-retained in any other PFB (which would not be the case in encoding of the first frame, but can be the case with the second or subsequent frames of the encoded video file), that duplicate macroblock is not decoded, and instead, the video decoder 516 creates a pointer element (not shown in detail in FIG. 5; i.e., which pointer element of the decode device 504 is distinct from the pointer element of the encode device 502) and stores the pointer element in the VFBT 520b for the second (or other subsequent) frame. The pointer element of the decode device 504 represents an identifier of the PFB 518a of the decode device 504 that contains the duplicate macroblock that was previously decoded, and also of a particular PFB sector (not shown in detail in FIG. 5) of that PFB 518a which contains the previously decoded macroblock for which the presently processed macroblock is duplicate.

The video decoder 516 continues processingly encoding each next frame of the encoded video file in succession (e.g., overwriting respective PFBs for frames after the third frame and storing or dispensing decoded frames of PFBs and VFBTs in storage memory or otherwise prior to overwriting) or, if any encoded macroblock(s) in the particular frame are same as then-retained in any of the PFBs from a prior frame which has already been decoded, skipping decoding of the macroblock for the particular frame and, instead, creating the respective pointer element for the previously decoded macroblock (and PFB sector and PFB thereof) and storing the pointer element in the VFBT for the particular frame. As the video decoder 516 completes decoding of each frame of the encoded video file, the video decoder 516 communicates the decoded frame as output of the video decoder 516. For example, each frame, once decoded, is communicated by the video decoder 516 as a stream to a media player, graphics card and/or other computer or processor device (hardware, software or combination) for display or other output on a monitor, screen, display or other output device, or is otherwise processed or stored in tangible media, such as hard-drive, memory or the like (not shown in detail in FIG. 5), available for selective used or operation for display of the video, or otherwise.

Figure 2:
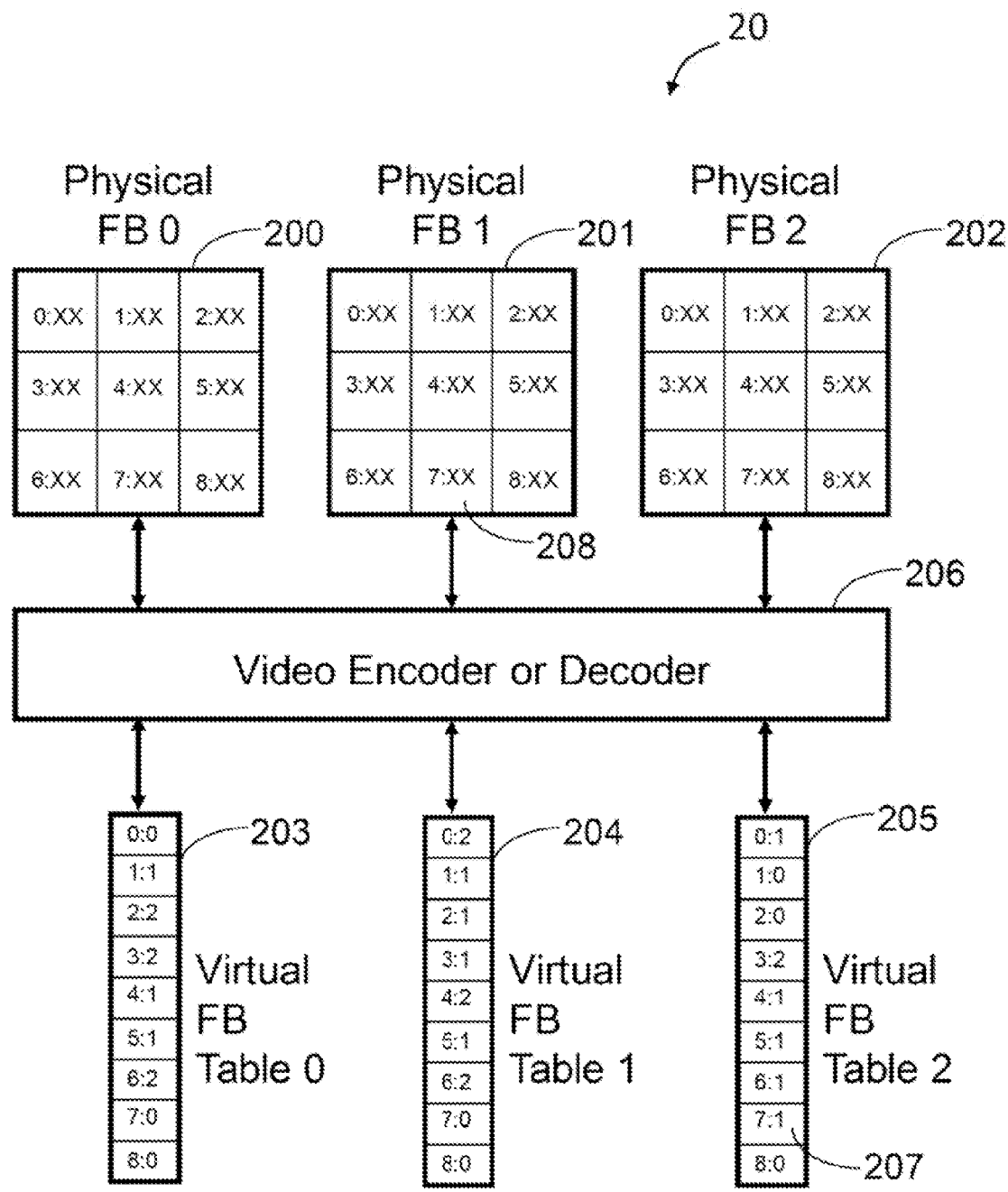
FIG. 2 illustrates exemplary functional elements of the system of FIG. 1, according to certain embodiments of the invention.

Referring to FIG. 2, in conjunction with FIG. 5, according to certain embodiments a system 20 includes the PFBs and the VFBTs as above-described and now further detailed in encode and decode operations. The system 20 also includes a video encoder/decoder 206, which can be either an encoder or a decoder (for example, the video encoder 510 of the encode device 502 and/or the video decoder 516 of the decode device 504). Because the embodiments of FIG. 5 and of FIG. 2 illustrate three PFBs and three VFBTs, respectively, for encoding and decoding operations, FIG. 2 for purposes of explanation refers to the video encoder/decoder 206 generically, intended as including any of an encoder, decoder or combination, in which the encode and/or decode processing employs PFBs and VFBTs according to the embodiments. The video encoder/decoder 206 are each implemented by creates and uses three virtual frame buffer tables (VFBTs) 203, 204, 205, and three physical frame buffers (PFBs) 200, 201, 202. The video encoder/decoder 206 communicatively accesses the three physical frame buffers (PFBs) 200, 201, 202 and also communicatively accesses the three virtual frame buffer tables (VFBTs) 203, 204, 205.

Each PFB 200, 201, 202 contains nine macroblocks, for example purposes as previously discussed. Therefore each VFBT 203, 204, 205 can include nine entry elements in memory. Each entry element of each VFBT 203, 204, 205 points to one of the PFBs 200, 201, 202. For example, entry element 207 of VFBT 205 contains a 1 which represents PFB 201. Entry element 207 is in the seventh location in the VFBT 205 and therefore corresponds to the macroblock 208 of the seventh location of the PFB 201. The video encoder/decoder 206, by reference to a particular one of the entry elements of one of the VFBTs 203, 204 or 205, is thus directed to read contents of a particular macroblock of particular one of the PFB 200, 201, 202.

In operation, all entry elements of each of the VFBT's 203, 204, 205 are initially set to a special value of "none". When a first frame (i.e., of a video graphic) is received for processing, one of the PFB 200, 201, or 202 and one of the VFBTs 203, 204, 205 is required by the encoder/decoder 206. The VFBT 203 and the PFB 200 are used: respective sets of bytes of the first frame are processed and a written to respective macroblocks of the PFB 200, and each entry element of the VFBT 203 is set to 0. This indicates for the encoder/decoder 206 that the all of the macroblocks for the VFBT 203 are contained in the PFB 200.

When a second frame buffer (i.e., a video graphic comprising a next (second) frame) is received, the encoder/decoder employs the VFBT 204 and the PFB 201. As macroblocks are written to the PFB 201, a 1 is written to the corresponding entry element of the VFBT 204, representing that the macroblock is stored in the PFB 201. When the video encoder/decoder 206 receives an indication that a macroblock matches the already stored macroblock in PFB 200 a 0 is written to the VFBT 204 by the encoder/decoder 206. The 0 entry of the VFBT 204 therefore indicates that the particular macroblock is contained in the PFB 200, and no macroblock was written in PFB 201. Thus, if there is match for a macroblock of the second frame, no entry other than the 0 in VFBT 204 is necessary. Less processing is therefore required.

For a next (third) frame, the PFB 202 and the VFBT 205 similarly operate and VFBT 205 is written with either: a 2 where the macroblock is new (i.e., not then-retained in a PFB as previously encoded/decoded) and will be written into the PFB 202, a 1 where the macroblock is already in the PFB 201, or a 0 where the macroblock is already contained in the PFB 200. PFB 202 is written with the macroblock only if contents are new (i.e., not already written in PFB because of another macroblock encode/decode operation) and therefore not contained in either PFB 200 or PFB 201.

After three frame buffer requests (i.e., three frames received), the process continues. The encoder/decoder 206 uses VFBT 0 203 again, now for the next frame. Referring to FIG. 2 as an example, for a first macroblock, entry element 0 in the VFBT 203 contains a 0, therefore the macroblock is in PFB 200. Entry element 0 in the VFBT 204 contains a 2 and entry element 0 in the VFBT 205 contains a 1, therefore, the PFB 200 is not referred to by either VFBT 204 or VFBT 205 and therefore is free to be used by the encoder/decoder 206 to store the first macroblock of the relevant frame. A 0 is written to the VFBT 203, location 0, representing that the macroblock is in PFB 200 and the marcoblock is written in PFB 200

Next in the example, for a second macroblock, entry element 1 in the VFBT 203 contains a 1; the VFBT 204, entry element 1, also contains a 1; and the VFBT 205, entry element 1, contains a 0. Because the PFB 202 is not referred to by any other VFBT, the encoder/decoder 206 uses the PFB 202 for storage of the second macroblock. The macroblock is written by the encoder/decoder 206 to the PFB 202, and a 2 is written into the VFBT 203, entry element 1, corresponding to the PFB 202.

Continuing for a third macroblock of the relevant frame, entry element 2 in the VFBT 203 is 2 (i.e., for PFB 202), VFBT 204 is 1 (i.e., for PFB 201), and VFBT 205 is 0 (i.e., for PFB 200). Since the VFBT 203 refers to the PFB 202 and the VFBT 204 and VFBT 205 do not, the PFB 202 is used by the encoder/decoder 206. The bytes of the macroblock are written by the encoder/decoder 206 to the PFB 202 and a 2 is written into the VFBT 203, entry element 2.

This process is repeated for the entire frame and the entire video, on a frame by frame basis. A destination device of the digitized video file from the video decoder 510 is, for example, a display for visually depicting the video in real-time or a memory or storage media.

Therefore in processing non-changing macroblocks (i.e., the macroblock has already been stored in a PFB), only a VFBT entry must be updated. For processing macroblocks that have changed, therefore, at most three VFBT entries must be read to determine which PBF to use. In comparison, without such embodiments, copying of an entire macroblock from one PFB to another PFB would be necessary. Thus the embodiments limit processing that would otherwise be required.

Figure 3:
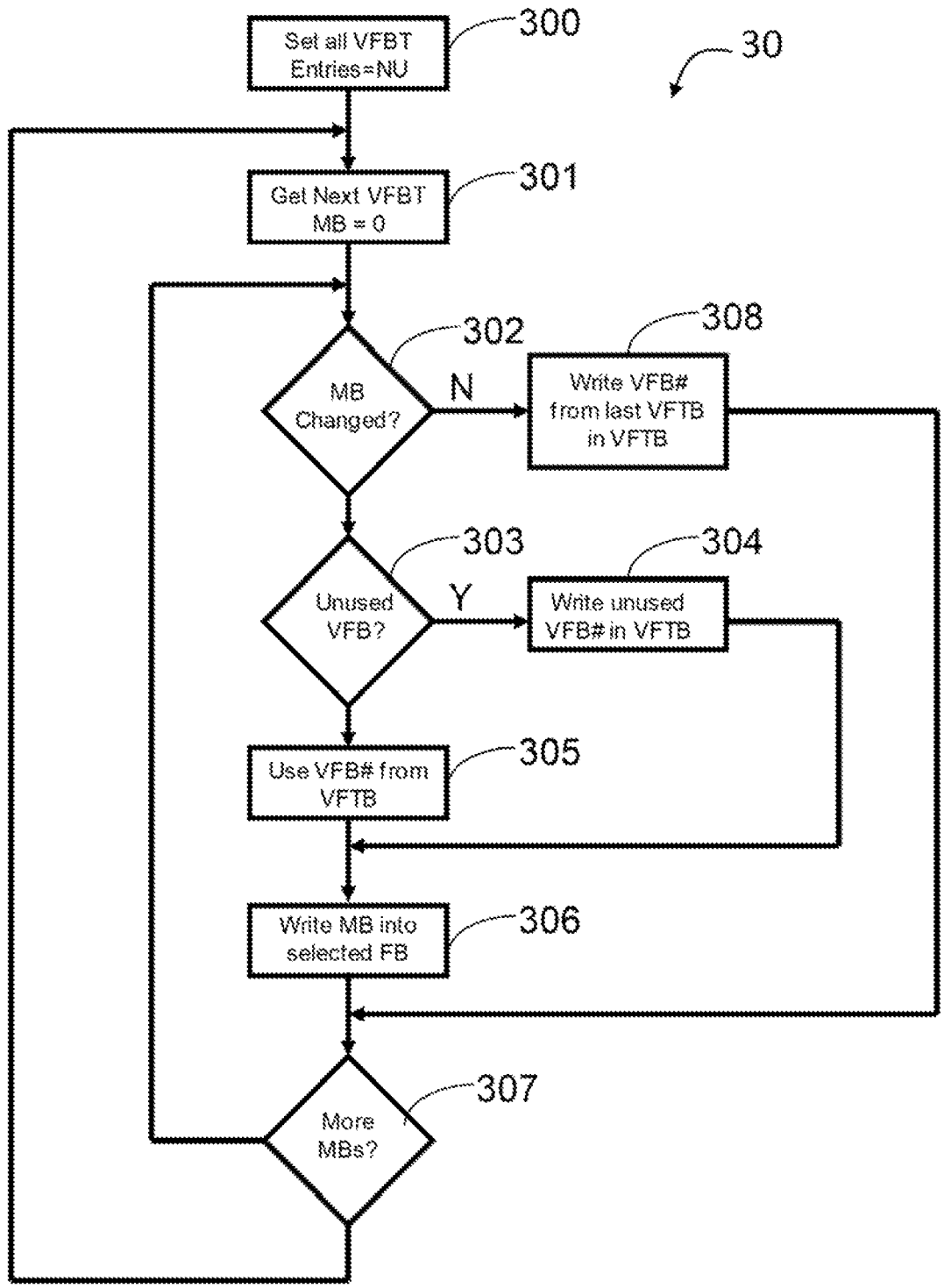
FIG. 3 illustrates an exemplary method for video encoding and decoding, according to certain embodiments of the invention.

Referring to FIG. 3, a method 30 commences with a step 300. In the method 30, the step 300 is performed once to commence operation on receipt of a first frame, and steps 301 are performed once for each frame and steps 302 to 307 are performed once for each macroblock of the frame.

In the step 300, all VFBT entries are set to a not used (NU) value. For each successive frame, a VFBT is selected 301 in order of precedence, for example, 0, 1, 2, 0, 1, 2, etc. In a step 302, an encoder or decoder receives an indication that a marcoblock has changed and has new contents or has not changed and matches a prior macroblock contained in one of the VBTs. If a match is indicated, an entry element of the PFB that already contains the new macroblock is written to an applicable VFTB in a step 308. The method 30 then continues to a step 307. If no match was indicated in the step 302, then determination is made by searching each of the VFBTs in a step 303 whether any of the PFBs are unused. If the step 303 determines there is an unused PFB, then a number identifier of the unused PFB is written to the VFBT in a step 304. If the step 303 determines that there are no unused PFBs, then a specified one of the PFBs referenced by the current VFBT is reused, in a step 305. The particular PFB reused in the step 305 is any PFB which is then unused by all other VFBTs. In a step 306, following the step 304 or the step 305, as applicable, the new macroblock is written to the PFB selected in the step 304 or 305, respectively. In a step 307 determination is made whether any more macroblock(s) exist in the current frame. If any more macroblock(s) is present, the method 30 returns to the step 302; otherwise, if no more macroblock(s) in this frame, the method 30 returns to the step 301.

Variations to the foregoing embodiments include encoders/decoders that employ a single reference frame buffer or different multiples (other than three as described above) of reference frame buffers and VFBTs.

Figure 4:
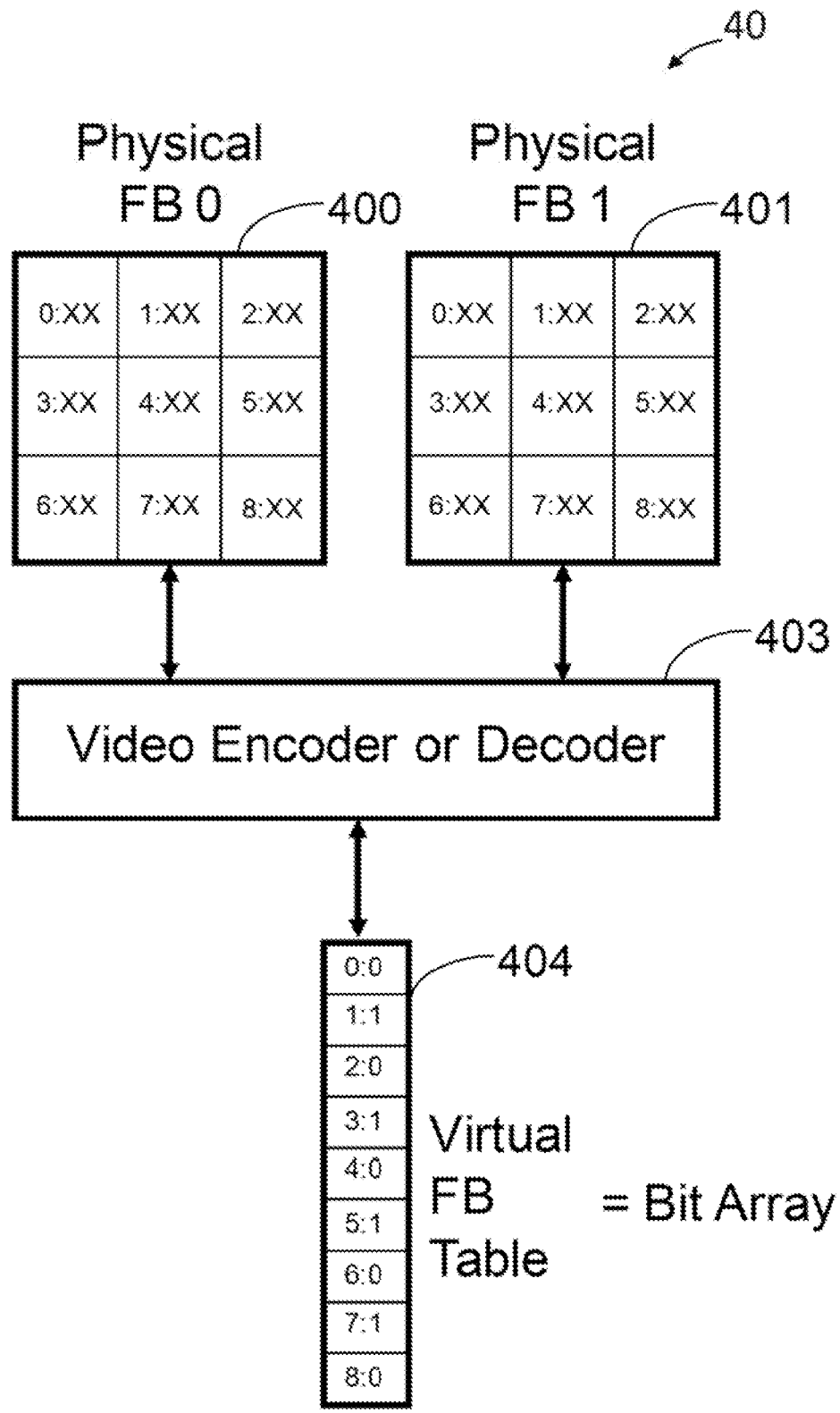
FIG. 4 illustrates another exemplary system of two reference frame buffers for video encoding and decoding via low-end elements, according to certain embodiments of the invention.

Referring to FIG. 4, a system 40 includes a video encoder/decoder 403 for communicatively connecting to two reference frame buffers (i.e., PFBs) 400, 401 and one virtual frame buffer (VFBT) 404 during processing of a video file (not shown). As with the foregoing embodiments, the encoder/decoder 403 creates the PFBs 400, 401 and the VFBT 404 in memory (not shown in detail in FIG. 4) and uses these for processingly encoding or decoding the video file. In particular, the PFB 400 and PFB 401 are employed, with one containing the reference frame relative to previously processed frame or frames (as will be understood) of the video file and the other containing a temporary current frame relative to the then-presently in process frame of the video file. Only the single VFBT 404 is required. Also since the VFBT 404 entry elements represent only possible values of either 0 or 1 (i.e., a 0 references PFB 400, a 1 references PBF 401), the VFBT 404 is implementable by the encoder/decoder 403 as a bit array, instead of as a set of memory locations in memory.

Operation is the similar to that described with respect to FIG. 2, but with two differences (at least). A first difference is that two frame buffers PFB 400 and PFB 401, instead of the three frame buffers PFB 200, PFB 201, PFB 202, are created and used by the encoder/decoder 403 during encode/decode processing. A second difference is that a second VFBT (not shown in detail in FIG. 4) is merely temporarily created by the encoder/decoder 403 as a copy of the single actual VFBT 404. This temporary second VFBT is employed by the encoder/decoder 403 to access the reference frame then-retained in the PFB 400 or 401 relative to previously processed frame or frames. Only the actual VFBT 404 is updated by the encoder/decoder 403 as frame processing proceeds. At the end of processing of a frame, VFBT 404 contains the VFBT for the single reference frame just processed. The temporary VFBT can be discarded. The process is repeated with the PFBs 400, 401 and VFBT 403 as to each next successive frame of the video file, by creation and store by the encoder/decoder 403 of the reference frame in the temporary VFBT and then discard of the temporary VFBT at end of processing the then-in-process frame.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems and device(s), connection(s) and element(s) that may cause any benefit, advantage, or solution to occur or become more pronounced are not to be construed as a critical, required, or essential feature or element of any or all the claims. As used herein, the terms "comprises, "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A device for encoding a file, the file comprises frames and each frame comprises macroblocks for encoding, comprising:
   memory;
   a processor communicatively connected to the memory;
   an encoder communicatively connected to and controlled by the processor;
   a first reference frame buffer in the memory, the first reference frame buffer capable of containing one of the frame;
   a first virtual frame buffer table in the memory;
   a plurality of sectors of the first reference frame buffer, each sector, respectively, capable of storing a distinct one of the macroblocks corresponding to part of the frame of the file; and
   a respective pointer stored in the first virtual frame buffer table, each respective pointer corresponds to one of the sectors, respectively, and refers to (i) if the macroblock of the sector is not matched by any other of the macroblocks of the other sectors then-having been encoded, the sector containing the macroblock, and (ii) if the macroblock of the sector is matched by another of the macroblocks of another of the sectors having then-been encoded, the other sector containing the other macroblock;
   wherein the encoder during encoding either encodes each next one of the macroblock of the frame or, if the next one of the macroblock is matched by another of the macroblocks of another of the sectors having then-been encoded, refers via the respective pointer to the other macroblock of the other sector and skips encoding of the next one of the macroblock;
   wherein the first virtual frame buffer table is a single bit array in the memory and each single bit of the array is positioned in the array to indirectly reference a respective location of the macroblock, previously encoded, then-retained in the first reference frame buffer referenced by the respective pointer.

2. A system according to claim 1, further comprising:
   a second reference frame buffer in the memory, the second reference frame buffer capable of containing another one of the frame;
   wherein the respective pointer stored in the first virtual frame buffer table refers to, if the macroblock of the sector is matched by another of the macroblocks of another of the sectors having then-been encoded of either the first reference frame buffer and the second reference frame buffer, the other sector containing the other macroblock of either the first reference frame buffer and the second reference frame buffer.

3. A device for decoding an encoded file, the encoded file comprises encoded frames and each frame comprises encoded macroblocks for decoding, comprising:
   memory;
   a processor communicatively connected to the memory;

a decoder communicatively connected to and controlled by the processor;

a first reference frame buffer in the memory, the first reference frame buffer capable of containing one of the encoded frame;

a first virtual frame buffer table in the memory, the first virtual frame buffer table corresponds to the first reference frame buffer;

a plurality of sectors of the first reference frame buffer, each sector, respectively, capable of storing a distinct one of the encoded macroblocks corresponding to part of the encoded frame of the encoded file; and a respective pointer stored in the first virtual frame buffer table, each respective pointer corresponds to one of the sectors, respectively, and refers to (i) if the encoded macroblock of the encoded frame of the encoded file is not matched by any other of the encoded macroblocks of the other sectors having then-been decoded, the sector containing the macroblock, and (ii) if the encoded macroblock matches any other encoded macroblock of another of the sectors having then-been decoded, the other macroblock of the other sector;

wherein the decoder during decoding either decodes each next one of the encoded macroblock of the encoded frame or, if the next one of the encoded macroblock is matched by another of the encoded macroblocks of another of the sectors having then-been decoded, refers via the respective pointer to the other of the encoded macroblock of the other sector and skips decoding of the next one of the encoded macroblock;

wherein the first virtual frame buffer table is a single bit array in the memory and each single bit of the array is positioned in the array to indirectly reference a respective location of the macroblock, previously decoded, then-retained in the first reference frame buffer referenced by the respective pointer.

4. The system of claim 3, further comprising:

a second reference frame buffer in the memory, the second reference frame buffer capable of containing another one of the encoded frame;

wherein the respective pointer stored in the first virtual frame buffer table refers to, if the encoded macroblock of the sector is matched by another of the encoded macroblocks of another of the sectors having then-been decoded of either the first reference frame buffer and the second reference frame buffer, the other sector containing the other macroblock of either the first reference frame buffer and the second reference frame buffer.

5. A method of encoding a file, the file comprises frames and each frame comprises macroblocks for encoding, comprising the steps of:

creating in a memory a first reference frame buffer, the first reference frame buffer capable of containing one of the frame;

creating in the memory a first virtual frame buffer table;

creating a plurality of respective sectors of the first reference frame buffer, each sector, respectively, sufficient for storage of a distinct one of the macroblocks corresponding to part of a frame of the file;

encoding the frame of the file, by successively encoding each respective one of the macroblocks of the frame, unless any already encoded macroblock (if any) then-retained in any of the respective sectors of the first reference frame buffer would be the same as the encoded macroblock, once encoded in the step of encoding;

storing respective ones of the encoded macroblocks, each respectively corresponding to respective ones of the macroblocks of the frame of the file from the step of encoding, in respective ones of the plurality of respective sectors, except not storing one of the encoded macroblocks if any already encoded macroblock (if any) then-retained in any of the respective sectors of the first reference frame buffer would be the same as the encoded macroblock, once encoded in the step of encoding;

creating a respective pointer in the virtual frame buffer table associated with the first reference frame buffer, for each macroblock (if any) of the frame then-currently for the step of encoding, if any macroblock of one of the frame previously encoded matches the macroblock of the step of creating a respective pointer and if the encoded macroblock of the frame previously encoded is then-retained in the first reference frame buffer;

storing the respective pointer from the step of creating the respective pointer (if performed), in the first virtual frame buffer table associated with the first reference frame buffer for the step of encoding; and returning to the step of encoding, but rather than encoding the macroblock in the step of encoding, relying on the respective pointer for encoding in order to reference the encoded macroblock;

wherein the encoder during encoding either encodes each next one of the macroblock of the frame or, if the next one of the macroblock is matched by another of the macroblocks of another of the sectors having then-been encoded, refers via the respective pointer to the other macroblock of the other sector and skips encoding of the next one of the macroblocks.

6. The method of claim 5, further comprising:

creating in the memory a second reference frame buffer table;

creating a respective pointer in the first virtual frame buffer table associated with the first reference frame buffer and the second reference frame buffer, for each macroblock (if any) of the frame then-currently for the step of encoding, if any macroblock of the sector is having then-been encoded of either the first reference frame buffer and the second reference frame buffer, the other sector containing the other macroblock of either the first reference frame buffer and the second reference frame buffer.

7. A method of decoding an encoded file, the encoded file comprises encoded frames and each encoded frame comprises encoded macroblocks for decoding and the file, when decoded, comprises frames and each frame comprises macroblocks, comprising the steps of:

creating in a memory a first reference frame buffer capable of containing one of the encoded frame;

creating in the memory a first virtual frame buffer table;

creating a plurality of respective sectors of the first reference frame buffer, each sector, respectively, sufficient for storage of a distinct one of the macroblocks corresponding to part of an encoded frame of the file;

decoding the encoded frame of the encoded file, by successively decoding each respective one of the encoded macroblocks of the encoded frame, unless the encoded macroblock, once decoded, would match any macroblock previously decoded and then-retained in any of the respective sectors of the first reference frame buffer;

storing respective ones of the macroblocks, each respectively corresponding to respective ones of the macroblocks of the frame of the file from the step of decoding, in respective ones of the plurality of respective sectors, except not storing one of the macroblocks if the macroblock, once decoded, would match any macroblock previously decoded and then-retained in any of the respective sectors of the first reference frame buffer;

creating a respective pointer in the first virtual frame buffer table associated with the first reference frame buffer, for each encoded macroblock (if any) of the encoded frame then-currently for the step of decoding if the encoded macroblock, once decoded, would match any macroblock previously decoded and retained in the first reference frame buffer;

storing the respective pointer from the step of creating the respective pointer (if performed), in the virtual frame buffer table associated with the first reference frame buffer for the step of decoding; and returning to the step of decoding, but rather than decoding the encoded macroblock in the step of decoding, relying on the respective pointer for decoding in order to reference the macroblock;

wherein the decoder during decoding either decodes each next one of the encoded macroblock of the encoded frame or, if the next one of the encoded macroblock is matched by another of the encoded macroblocks, then decoded, of another of the sectors, refers via the respective pointer to the other macroblock of the other sector and skips decoding of the next one of the encoded macroblocks.

8. The method of claim 7, further comprising:

creating in the memory a second reference frame buffer table;

creating a respective pointer in the first virtual frame buffer table associated with the first reference frame buffer and the second reference frame buffer, for each macroblock (if any) of the frame then-currently for the step of decoding, if any macroblock of the sector is having then-been decoded of either the first reference frame buffer and the second reference frame buffer, the other sector containing the other macroblock of either the first reference frame buffer and the second reference frame buffer.

* * * * *